US012638016B2

(12) United States Patent　　　(10) Patent No.:　US 12,638,016 B2
　　　Sostaric　　　　　　　　　　　　(45) Date of Patent:　May 26, 2026

(54) CONCRETE PUMP WATER BOX LEVEL SENSOR

(71) Applicant: Joseph Sostaric, Danville, CA (US)

(72) Inventor: Joseph Sostaric, Danville, CA (US)

( * ) Notice: Subject to any disclaimer, the term of this patent is extended or adjusted under 35 U.S.C. 154(b) by 455 days.

(21) Appl. No.: 18/085,561

(22) Filed: Dec. 20, 2022

(65) Prior Publication Data

US 2023/0243349 A1　Aug. 3, 2023

Related U.S. Application Data

(60) Provisional application No. 63/291,860, filed on Dec. 20, 2021.

(51) Int. Cl.
　　*F04B 49/06*　　　(2006.01)
　　*F04B 15/02*　　　(2006.01)
　　*G05B 19/416*　　(2006.01)
　　*G08B 21/20*　　　(2006.01)
　　*G01F 23/263*　　(2022.01)
　　*G01F 23/284*　　(2006.01)
　　*G01F 23/292*　　(2006.01)
　　*G01F 23/2962*　(2022.01)

(52) U.S. Cl.
　　CPC ............ *F04B 49/065* (2013.01); *F04B 15/02* (2013.01); *G05B 19/416* (2013.01); *G08B 21/20* (2013.01); *G01F 23/263* (2013.01); *G01F 23/265* (2013.01); *G01F 23/284* (2013.01); *G01F 23/292* (2013.01); *G01F 23/2962* (2013.01); *G05B 2219/37371* (2013.01)

(58) Field of Classification Search
　　CPC .......... F04B 49/065; F04B 15/02; F04B 1/02; F04B 49/02; F04B 49/10; F04B 53/08; F04B 51/00; G05B 19/416; G05B 2219/37371; G08B 21/20; G01F 23/263; G01F 23/265; G01F 23/284; G01F 23/292; G01F 23/2962

See application file for complete search history.

(56) References Cited

U.S. PATENT DOCUMENTS

2021/0310482 A1* 10/2021 Vasquez ................ F04B 15/023

FOREIGN PATENT DOCUMENTS

CN　　　207505676 U　*　6/2018
CN　　　210623064 U　*　5/2020
WO　　WO-2020068667 A1　*　4/2020　.............. F04B 15/02

OTHER PUBLICATIONS

English Translation of "CN-207505676-U" (Year: 2010).*
English Translation of "CN-210623064-U" (Year: 2020).*

* cited by examiner

*Primary Examiner* — Charles R Kasenge
(74) *Attorney, Agent, or Firm* — Mark Lawrence Lorbied

(57)　　　　　ABSTRACT

An apparatus and method for preventing undue wear on a concrete pump relies upon monitoring a volume of water in a water box for cooling and lubricating pumping seals on a material pumping piston within a material pumping cylinder. The apparatus includes a water level sensor to generate signals corresponding to a water level in the water box. The signals are received at a computing device including a central processing unit (CPU) to apply an algorithm drawn from the memory to determine whether the water level in the water box is sufficient for operation of the concrete pump and if not sufficient, to generate a water level alert. The CPU sends a water-level alert and in response to the alert, to execute a pump-preserving action. Such a pump-preserving action may include sounding a klaxon alarm; displaying an alert; playing a recorded warning; and shutting down operation of the concrete pump.

14 Claims, 8 Drawing Sheets

*(Prior Art)* FIG.1

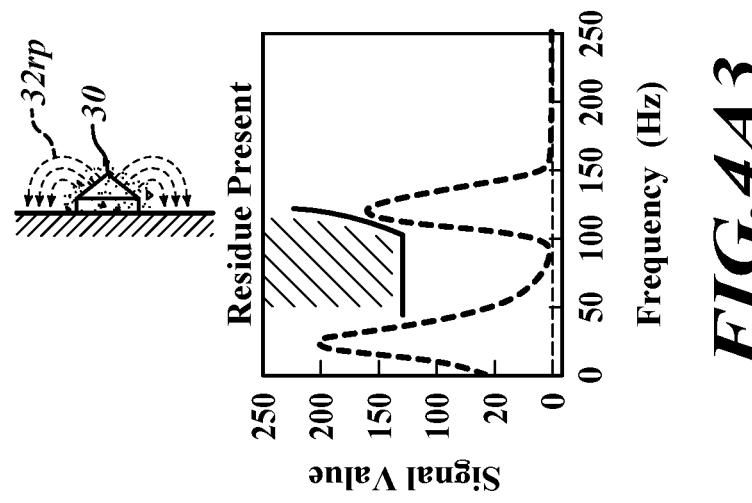
*FIG.4A1*
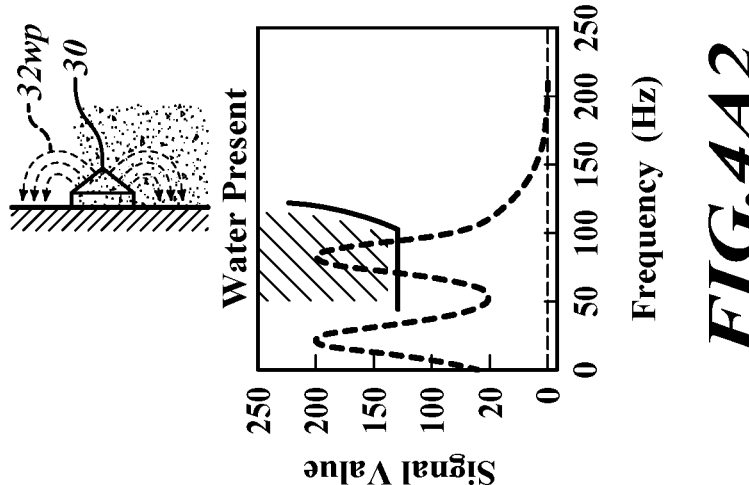
*FIG.4A2*
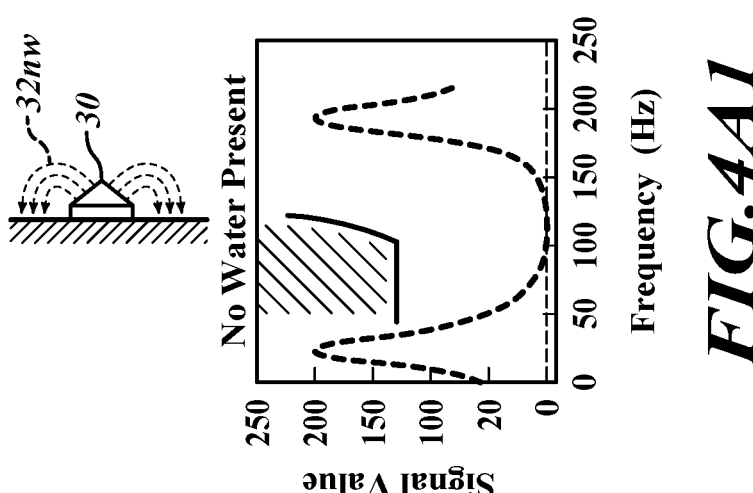
*FIG.4A3*

CONCRETE PUMP WATER BOX LEVEL SENSOR

FIELD OF THE INVENTION

The present description sets forth sensor for water box level in a piston concrete pump, specifically for sensing failure of piston pump seals.

BACKGROUND OF THE INVENTION

Pumping concrete through metal pipelines by piston pumps was introduced in the United States in Milwaukee in 1933. This concrete pump used mechanical linkages to operate the pump and usually pumped through pipelines 6 in. or larger in diameter.

Pumping may be used for most concrete construction but is especially useful where space for construction equipment is limited. Concrete pumping frees hoists and cranes to deliver the other materials of construction concurrently with concrete placing. Also, other crafts can work unhampered by concrete operations.

By way of overview, most common concrete pumps include a receiving hopper to feed concrete mix to each of two concrete pumping cylinders, and a valving system to alternately direct the flow of concrete into the pumping cylinders from the hopper and out from them to the pipeline for placement. Generally, the hopper has a mesh grate the concrete mix falls through but prevents any large rocks or chunks from plugging the pump truck hoses. The hopper also has an auger that churns the concrete keeping it liquid and flowable.

Referring to FIG. 1, a conventional concrete pump 50 is driven by a pressurized flow of hydraulic oil, powered by any of several rotary machines such as a gasoline engine, diesel engine, or electric motor (not shown herein). Hydraulic pumps 61 are of either fixed or positive displacement type or variable type. For fixed displacement pumps, the volume is controlled by the capacity of the pump and the speed of the electric motor. Fixed displacement pumps include internal and external gear pumps, axial and radial piston pumps, screw pumps, and vane pumps. Variable volume pumps are designed and constructed as variable flow or displacement, and these are typically vane pumps. In this explanation of powering the concrete pump 50, the presence of a source of pressurized hydraulic fluid capable of a sustained flow is presumed. For that reason, the hydraulic pump 61 and its return reservoir 63 are pictured herein.

The conventional concrete pump 50 with its pair of pumping pistons relies upon a fully hydraulic, twin-cylinder, reciprocating design. Thus, in FIG. 1 an exemplary conventional pump 50 generally comprises two double-acting hydraulic cylinders 83p and 83s receiving the hydraulic flow from the hydraulic pump 61 to motivate two pistons 81p and 81s as each reciprocates within one of two hydraulic cylinders 83p and 83s, each in their respective positions, port or starboard. To accomplish this reciprocal motion, a control valve box 77 receiving the hydraulic flow from the hydraulic pump 61 through the hydraulic feed tube 65 alternately pressurizes the rod-side of one of the hydraulic pistons, for example the port hydraulic piston 81p within the port hydraulic cylinder 83p through the port charging tube 66p. The hydraulic pressure in the port hydraulic cylinder 83p moves the port hydraulic piston 81p towards its outer extremity.

A volume of hydraulic fluid contained in the port hydraulic cylinder 83p between the outer extremity is driven through the communicating tubing 69 to the outer extremity of the starboard hydraulic cylinder 83s to drive the starboard hydraulic piston 81s back towards the water box 20. Once the pistons 81p and 81s traverse the length of their respective cylinders 83p and 83s, the control valve box 77 reverses its orientation directing the pressurized hydraulic flow to the rod-side of the port hydraulic cylinder 83p to drive the port hydraulic piston 81p back to its outer extremity in the port hydraulic cylinder 83p. The volume of hydraulic fluid in front of the port hydraulic piston 81p is driven back through the communicating tubing 69 to drive the starboard hydraulic piston 81s down the starboard hydraulic cylinder 83s, reversing the process. In this fashion, the reciprocal motion of the port and starboard pistons 81p and 81s is conveyed to the port and starboard material pumping pistons 89p and 89s by means of connecting rods 85p and 85s.

To further describe the function of the valve control box 77, the movement of hydraulic pistons 81p and 81s is controlled by the actuation within the valve control box 77. Just as with timing of a sewing machine or the valves of an internal combustion engine, the timing of the valves is a simple mechanical and conventional mechanism. Given that the valve timing is known, the movement of the port and starboard hydraulic pistons 81p and 81s is easily synchronized. As each of the two hydraulic pistons 1 move back and forth (i.e., reciprocates) the connecting rods 85p and 85s convey this reciprocating movement to a corresponding material pumping piston 89p and 89s (not shown but present within the starboard cylinder 87s).

When one hydraulic piston, for example the port hydraulic piston 81p reaches the end of its stroke, valve switching diverts the flow to the opposite cylinder from port hydraulic cylinder 83p to the starboard hydraulic cylinder 83s to drive the other hydraulic piston, the starboard hydraulic piston 81s to the opposite end of its stroke. Similarly, the valve control box 77 also sends a pressurized flow of hydraulic fluid alternately to each of the port and starboard actuators 75p and 75s, which, in turn moves the control arm 73a which moves a diverting pipe 91 to expose one side of a sliding valve arrangement to draw in a volume of concrete c into a material pumping cylinder, in the illustrated case, the port material pumping cylinder 87p. Once full, the valve control box 77 diverts the flow to the starboard actuator 75s to move the control arm 73a to receive the volume of concrete diverting the volume through the output o through a diverting tube 91. Much like a bicycle pump, the reciprocating action of each piston 89p and 89s (not shown) respectively, within its corresponding pump cylinder 87p and 87s, serves to move a volume of concrete mix. The control box 77 with its own valving, alternately actuates each of a port and starboard actuator 75p and 75s in a manner to synchronize the reciprocal movement of the material pumping pistons 89p and 89s such that as the diverting tube 91 is positioned to selectively opens each material pumping cylinder 87p and 87s to either receive a flow from a concrete hopper 92 or when the pump piston 87p or 87s advances to motivate a flow of concrete mix from the pump cylinder 87 into the diverter tube 91 (in this exemplary drawing, an "S"-shaped discharge transfer tube 91).

Reviewing FIG. 2 (also prior art conventional concrete pump), both material pump cylinders 87 include pistons 87 driven by hydraulic pistons 81, each reciprocating within a hydraulic cylinder 83. The piston has replaceable wear surfaces such as the hydraulic seals 82b used to scrape the internal surfaces of the hydraulic cylinder 83 free of hydraulic fluid to assure a seal between a distal component 84 of the hydraulic piston 81. A spacer 82b separates the hydraulic seals 82*h* from the water seals 82*w*. Here is evident the water box 20 enclosing, when operated appropriately, a volume of water 21 which, while a material pumping piston (not shown) reciprocates in the material pumping cylinder 87, both lubricates and cools the material pumping piston.

The purpose of the material pumping piston 89 is to push the material through the material cylinder 87. The material pumping piston 89 includes a second set of seals generally known as a "U" cup which is on the extreme end of the material pumping piston. On each stroke of the material piston 89, a wiping action takes place to remove the concrete mix from interior surfaces of the material pumping cylinder as mix-tight close fit of the "U" cup causes its walls to engage the inner surface of the material pumping cylinder 87 housing. The reciprocating motion of the material pumping piston 89 against the interior surface of the material pumping cylinder 87 and the abrasive nature of the concrete material will eventually wear the "U" cup making it necessary to replace the material pumping piston 89. The influence of gravity g on the volume of water 21 drives water deep into the water box 20 thereby maintain an immersing, cooling, lubricating jacket that the volume of water 21 around the material pumping piston 89. That volume of water 21 lubricates and cools the seals overcoming static friction or stiction.

In conventional construction of the dual cylinder concrete pump 50, the water box 20 also acts as a rigid frame mounting structure for the material pumping cylinders 87 positioning the hydraulic cylinders 83 in opposed relationship. While it does act as a chassis, the water box 20 has as its principal purpose to serve as a reservoir to hold lubricating water 21. The elongate shape of conventional concrete pumps 50 requires such a stiffening framework. In conventional concrete pumps 50, a role for which the water box 20 serves admirably; the pair of material cylinders 87 are, therefore, detachably fastened at the water box 20. However, because both the hydraulic cylinders 3 and the material cylinders 9 reciprocate along the same axis such that the two systems are parallel but offset one from the other, the stresses on the water box 20 are generally along these axes. The water box 20 maintains the alignment of these hydraulic cylinders 83 and the material pumping cylinders 87 as is necessary to assure that movement is truly axial thereby to minimize wear.

It's important to maintain the proper level of water or any kind of lubricant within the concrete pumps 50 water box 20. Immersion keeps the material pumping pistons 89 cool and lubricated for the extent of their trip through the material cylinders 87. The reciprocating movement of hydraulic pistons 81*p* and 81*s* and the material pumping pistons 89*p* and 89*s* is constant in operation and frequent. For example, a Putzmeister TK70 concrete pump can range between 40 to 45 strokes per minute. This level of friction can be punishing to the rubber material which the seals 82*w* comprise as well as the "U" cups. Worn "U" cups allow more of the highly abrasive concrete material to slide in between the "U" cup and the inner surface of the cylinder thereby causing undue and premature wear and eventual tearing at the borders of the seals. Generally, as the rubber seal "U" cup on the material piston 89 and the water seals 82*w* become worn, such wear then accelerates as more and more concrete mix lodges between the seals 82*w* and the cylinder interior surfaces 87. The wear accelerates after pumping about 1,000 cubic yards of concrete, and causes the degrading of the seal separating pumped material (concrete) from immersing water 21. Once worn, the suction movement of the material pumping piston 89 generates to draw concrete material from the hopper 12 will also draw water 21 past the worn seals 82*w* from the pump water box 20. The suction draws down the volume of water 21 from the water box 20 robbing the material pumping piston 89 of water which keeps the material cylinder's inner surface suitably slippery as the outer surface of the "U" cup passes over it. In the exemplary case of the a Putzmeister TK70 concrete pump 50, such "U" cup replacement is usually necessary after pumping 4,000 to 7,000 cubic yards of concrete. The timing of this replacement, when prudently observed, can stretch the life of both the material pumping cylinders 87 and the pistons 89. But, the optimally timed replacing of the "U" cups so as to assure this preservation of the material cylinder 87 and piston 89 is accomplished just when, in operation, the reciprocating action of the material pumping pistons 89 in the material pumping cylinders 87 draws down a volume of water 21 from the water box 20 while at the same time adulterating the water 21 with significant volumes of concrete material.

The problem is that such an observation water loss or clouding of the water 21 as such signs are indicative of "U" cup wear is conventionally left to the operator. Watching the water box 20 and level and clarity of water 21 within the water box 20 is a tedious, boring, and monotonous task. Failure to timely observe the passage of water 21 past the "U" cup seals and water seals 82*w* can result in a catastrophic wear event. What is needed in the art is an automated means of monitoring the volume of water 21 in the water box 20. Such monitoring assures a suitable timing of the replacement of "U" cups and water seals 82*w* to optimize the life of the water seals 82*w* and the corresponding material pumping piston 89 and the material pumping cylinder 87.

SUMMARY OF THE INVENTION

An apparatus and method for preventing undue wear on a concrete pump relies upon monitoring a volume of water in a water box for cooling and lubricating pumping seals on a material pumping piston within a material pumping cylinder. The apparatus includes a water level sensor to generate signals corresponding to a water level in the water box. The signals are received at a computing device including a central processing unit (CPU) to apply an algorithm drawn from the memory to determine whether the water level in the water box is sufficient for operation of the concrete pump and if not sufficient, to generate a water level alert. The CPU sends a water-level alert and in response to the alert, to execute a pump-preserving action. Such a pump-preserving action may include sounding a klaxon alarm; displaying an alert; playing a recorded warning; and shutting down operation of the concrete pump.

BRIEF DESCRIPTION OF THE DRAWINGS

Preferred and alternative examples of the present invention are described in detail below with reference to the following drawings:

FIGS. 4A1, 4A2, and 4A3 are depictions of capacitive sensors in each of three distinct states sensing, respectively, the capacitive sensor with no water present, water present, and with merely residue present;

DETAILED DESCRIPTION OF THE PREFERRED EMBODIMENT

Figure 1:
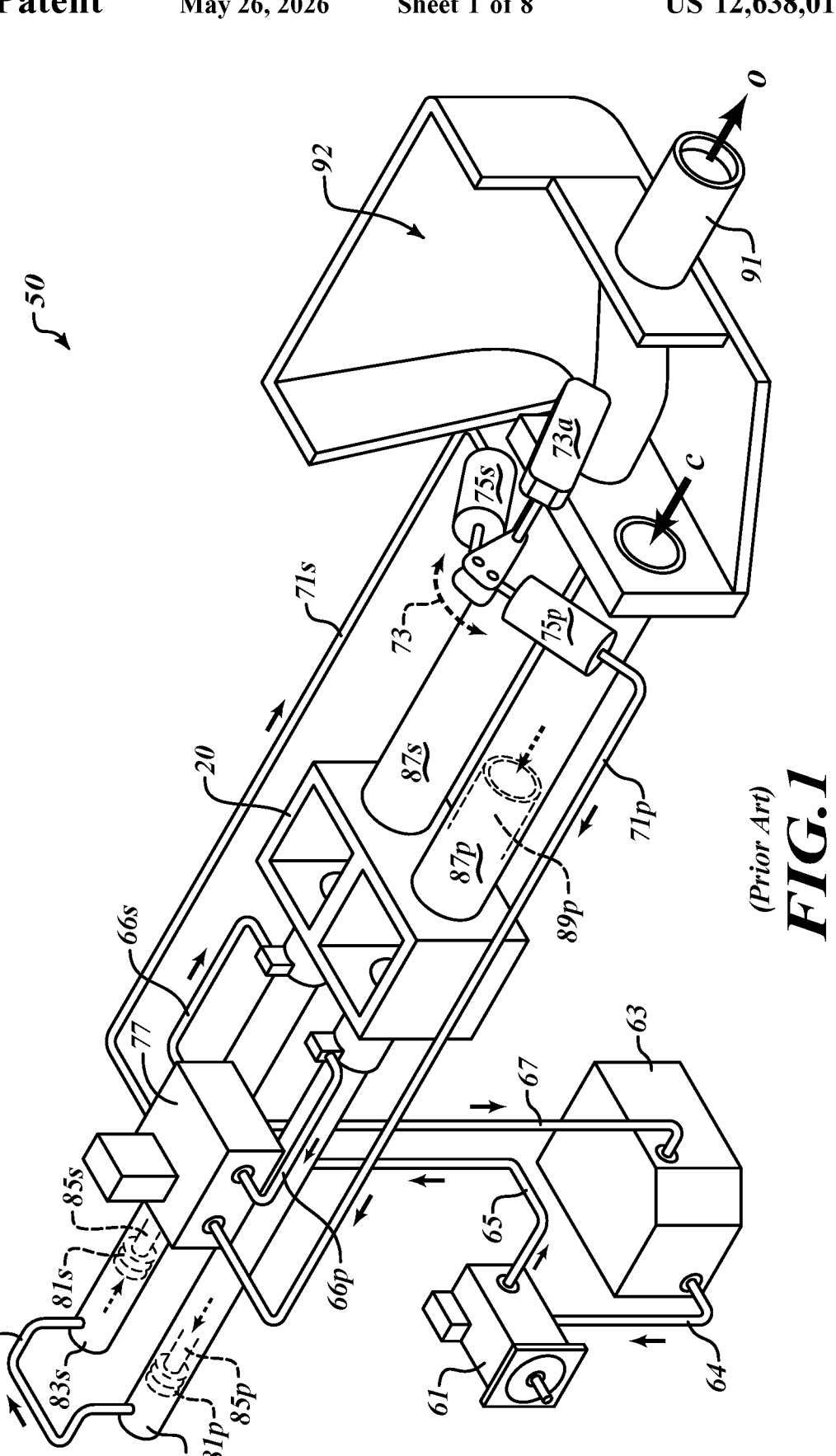
FIG. 1 depicts a prior art conventional concrete pump.

The most common concrete pumps 50 are configured as set forth in FIG. 1. In operation, such concrete pumps 50 operate by pushing concrete ahead of each of a pair of material pistons 89, each reciprocating within a material cylinder 87. The material pistons 89 are motivated by connecting rods 85 extending from double-acting hydraulic cylinders 83. Material pumping pistons 89, also commonly called mud pistons or mud cups, push the concrete through the pump or material cylinders 87. These mud or material pumping pistons 89 work in tandem. While one material piston 89 is drawing concrete from the hopper 92 into the its corresponding cylinder 87, the other material piston 89 is pushing concrete out of the cylinder 87 and out of the discharge tube 91 through the pump 50.

As stated above, the material pistons 89 move forward and backwards through the material cylinders 87 to drive concrete into the discharge tube 91 (again, "S-shaped" in this exemplary diagram). The double-acting hydraulic cylinders 83 move to drive the material pistons 89 through the connecting rods 85. During operation, a control valve box 17 alternately pressurizes the rod-side of one of the hydraulic pistons to cause movement into the hydraulic cylinder 83. Each of the two hydraulic pistons 81 move back and forth (i.e., reciprocates) to similarly move a material piston 89 connected by a connecting rod 85 to the corresponding hydraulic piston 81. As stated, the double-acting hydraulic cylinders 83 are connected by hydraulic plumbing and share hydraulic oil on one side of their pistons. This shared oil, called rocking oil, keeps the two pistons 81 moving in offset synchronization.

Except at the ends of travel, the hydraulic pistons 1 move in opposite directions being in 180-degree relationship, one to the other. Using the exemplary Putzmeister TK70 concrete pump operating at a pumping rate of 30 cubic yards per hour (39 cuyd/h) pressure within the cylinders can reach a concrete pressure of 112 bar (11,200 kPa; 1,624 psi). Considering that such is the pressure being applied uniformly within the volume defined by the material piston 7 residing in the material cylinder 9, one must understand that the pressure is also asserted against the "U" cup seals on the material piston 87. Thus, should the material seals fail, that same force will motivate a jet of concrete material backwards past the seals into the interspace between the hydraulic piston 81 and the material piston 89, the space the connecting rods 85 occupy.

Figure 2:
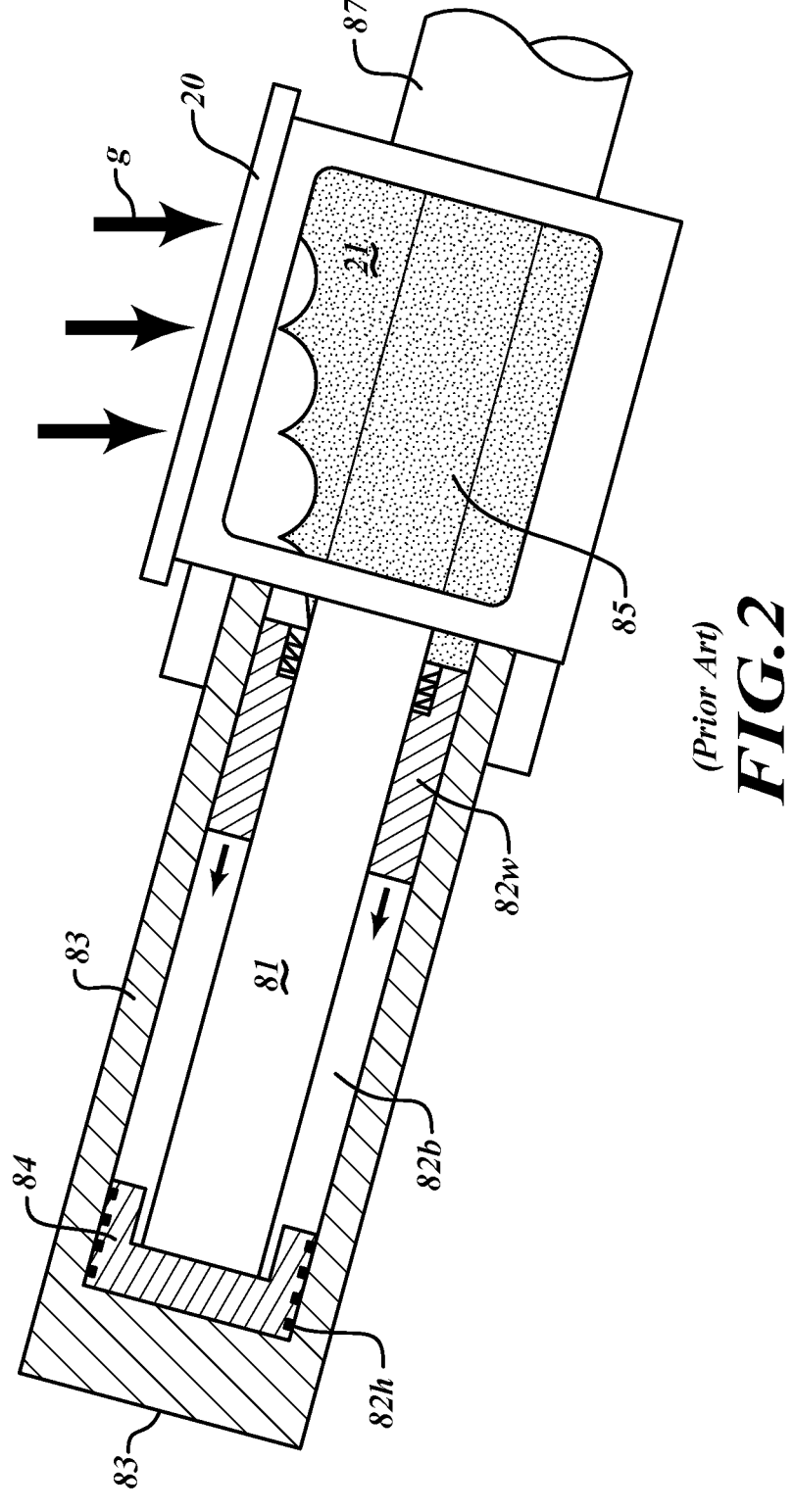
FIG. 2 depicts a prior art conventional water box in relation to each of a hydraulic cylinder and a material cylinder for pumping concrete.

Referring to FIG. 2, water is used to lubricate and cool the "U" cup seals to make certain that in movement, the seals are not deformed by exerted friction on the borders. The material pistons 89 pass through a water box 20 on the pump which keeps the seals constantly immersed to cool and lubricate the "U" cups in reciprocating movement. As the concrete pump 50 pumps concrete, the water 21 within the water box 20 is in constant motion making it challenging to measure the quantity of water 21 within the box 20. Failure to keep an adequate amount of water in the water box will cause excessive and premature wear to the concrete cylinders (often called barrels). Excessive wear of the barrels impacts the ability of the concrete pump 50 to efficiently pump concrete. Generally, failure of the "U" cup as a seal is detected when concrete starts to appear in the water box. Another indication of seal failure is the rapid loss of water 21 in the water box 20 as the suction on the drawing stroke of the material piston 89 draws water from the water box 20 past the "U" cup seal. Such a failure requires replacement of the "U" cup.

The "U" cups are normal wear parts on the concrete pumps 0 that must be replaced on a regular basis. It is most often the responsibility of the pump operator to advise when the "U" cups need replacement. As the "U" cups wear, the level of water 21 in the water box 20 will drop and soon the quality of the water 21 in the water box 20 will degrade as cement slurry from the concrete will leach into the water box 20. The level of water 21 will drop because the seal between the "U" cup mounted on the material piston 89 and the material cylinder 87 wall will deteriorate causing water 21 in the water box 20 to either be pushed into the concrete found in the material cylinder 87 or flow down the material cylinder 9 and flow back into the concrete hopper.

Electronic Processor for Automated Monitoring of Water Level in Water Box.

Electronic monitoring relies upon the ability to react to what is monitored and thus requires some form of controller. Referred to herein as either CPU or controller refers, in a preferred embodiment as a Programmable Logic Controllers (PLC). PLCs are industrial computers that contain hardware and software used to perform control functions in response to sensor signals received from various sensors. More specifically, a PLC enables automation of industrial electromechanical processes having multiple arrangements of digital and analog inputs and outputs.

While other controllers might serve as a suitable mean for effecting the inventive method, in the presently preferred embodiment, the selected controller is a PLC. Generally, PLCs are rugged to operate in extended temperature ranges, having immunity to electrical noise, and unaffected by vibration and impact. PLCs are expected to work flawlessly for years in industrial environments that are hazardous to the very microelectronic components that give modern PLCs their excellent flexibility and precision.

Figure 3:
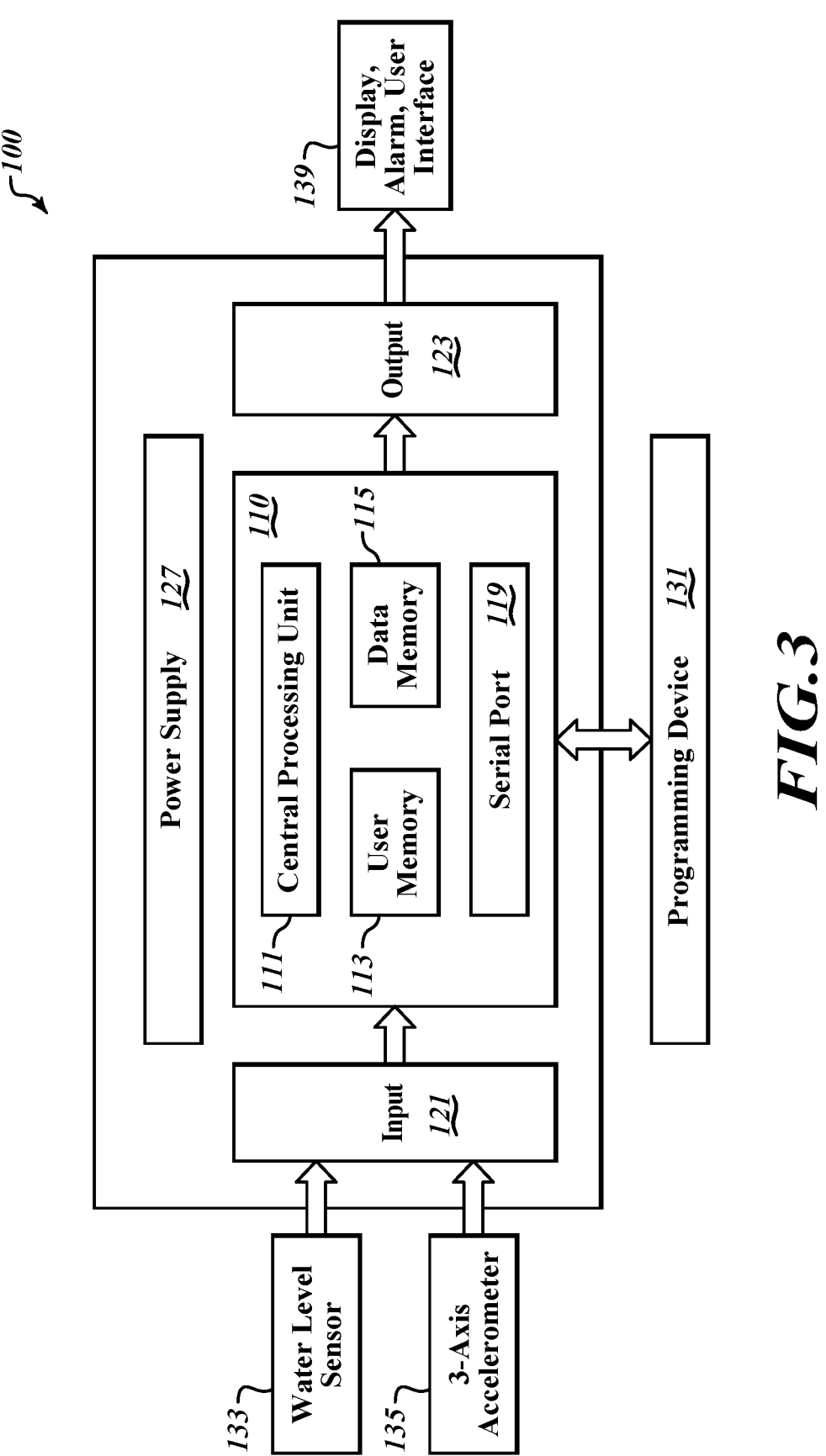
FIG. 3 depicts a control system to warn an operator to replace "U" cup seals on material pistons of the concrete pump.

Referring to FIG. 3, in a nonlimiting exemplary embodiment, a PLC 100 is used to receive signals representative of a water level representing the volume of water 21 in a water box 20 (FIGS. 1, 2). Nothing limits this invention to a PLC as any conventional computer or, indeed, any conventional tablet or conventional computing device can be used but because of their rugged nature, a PLC 100 is used as an exemplary embodiment. The exemplary processor comprises two basic sections: a central processing module 110, itself comprising a central processing unit (CPU) 111 using a user memory 113, data memory 115 and a serial port 119 by which the CPU 111 communicates with the second section, an Input/Output (I/O) interface system having an input stage 121 and an output stage 123. The I/O modules are used to bring input signals from sensors (a water-level sensor 133 and a 3-axis accelerometer 135 into the PLC's CPU 111 and output control signals to controlled devices such as motors and actuators, or as in this presently preferred embodiment, a user interface 139 that might include a display or an alarm. As with any electronic device, the PLC 100 requires a source of power, in this case a power supply 127 which might be either a battery or a power feed from an alternator on the driving gasoline or diesel engine that powers the concrete pump driving the hydraulic pump. Intermittently, a programming device 131 can be connected to the central processing module 110 which is used to create; edit and download a user program to the PLC.

Additional components (not pictured) might, optionally, include:

Network interfaces: to allow PLCs to function in a networked environment including such wireless interfaces such as Bluetooth® and WiFi radio interfaces;

Communication adapters for remote I/O devices: so I/O devices do not have to be physically close to the CPU module; and Operator interface devices: allow monitoring and/or data entry by operators.

The central processing module 110 of the PLC is very similar to that of a conventional microprocessor/microcontroller as those used in personal computers and other data-processing equipment. However, a logic control system has no memory and does not consider any previous values of the input signals in determining the output signal. The CPU 111 controls and processes all the operations within the PLC. It is supplied with a frequency and a clock. Frequency determines the operating speed of PLC and provides timing and synchronization for all elements in the system. A bus system carries information and data to and from the CPU, memory and input/output units. PLC 100 is designed for multiple input and output arrangements extendable to further required modules. There are several memory elements: a system read only memory (ROM) to give permanent storage for the operating system and fixed data, random access memory (RAM) for the user's program, and temporary buffer stores for the input/output channels. The automation process also has flexibilities in programming and control techniques. The PLC is designed to provide flexibility in control-based programming, executing logic instruction and realization of complex control algorithms. PLC allow for shorter installation time and faster commissioning through programming rather than wiring.

Programming software is typically PLC specific. PLC software is installed on a personal computer/laptop programming device 131 in a similar manner to any other computer software. PLC programs may be written in any of three forms, namely ladder logic diagram, statement list and function block diagrams. Generally, PLC is programmed using ladder logic method. The PLC program (ladder logic diagram) written on computer which have PLC software installed and it can be stored in PLC memory. The program is created in a programming device and then transferred to the PLC. A software program is required to tell the PLC what instructions it must follow. The PLC system can easily create or change a program with the help of programming device (computer/laptop) with installed PLC software and connecting cable.

Sensing the volume of water 21 within the water box 20 can only occur when the water 21 is relatively still in the water box 20. In some embodiments, the water box 20 may also define a well distinct from that interspace to accommodate connecting rods 85 (FIGS. 1, 2) extending from the hydraulic pistons 81 to the material pumping pistons 89 and to contain the volume of water 21. Because the reciprocating movement of the hydraulic pistons 81, the connecting rods 5 and the material pumping pistons 89 imparts enough turbulence to the water 21 to prevent reasonable measurement of the volume of water 21 in the water box 20. For that reason, the connecting well is configured to isolate a portion of the volume of water 21 from that turbulence allowing a readier measurement of that volume of water in the water box 20.

Mechanical vibration may be transmitted through the rigid form of the water box 20 thereby imparting turbulence to the volume of water 21. But concrete pumping is seldom a constant activity. Forms are filled and then the operator moves to another form. When no concrete is flowing through the system, the material pumping pistons 89 pause in their reciprocal motion. At such times, the volume of water 21 in the water box 20 contains is readily measured by simply measuring the level of water 21 standing in the water box 20 with the water level sensor 133 during these times of pause.

MEMS stands for microelectromechanical system and applies to any sensor manufactured using microelectronic fabrication techniques. These techniques create mechanical sensing structures of microscopic size, typically on silicon. When coupled with microelectronic circuits, MEMS sensors can be used to measure physical parameters such as acceleration. In the presently preferred embodiment, a variable capacitive MEMS three-axis accelerometer is used to sense movement of the water box 20. Variable capacitive MEMS accelerometers are lower range, high sensitivity devices used for structural monitoring and constant acceleration measurements as the accelerometer 135. In contrast, piezoresistive MEMS accelerometers are higher range, low sensitivity devices used in shock and blast applications. For that reason, the presently preferred embodiment comprises a three-axis accelerometer 135 which sends a signal of movement of the water box 20 and assists the PLC 100 in sensing intervals in which more valid measurement of the volume of water 21 are possible. The presently preferred embodiment relies upon sensing elements, i.e. the three-axis accelerometer 135 and the water level sensor 133, installed on the otherwise conventional concrete pump 50. At moments when the volume of water 21 falls below a designated threshold, the CPU 111 will, based upon received and processed sensor signals emanating from each of, at least, the three-axis accelerometer 135 and the water level sensor 133, stop the pump 50 to prevent undue wear or other injury to the pump 50 by virtue of failure of lubrication or cooling by the requisite volume of water 21 in the water box 20. Using the signals from the motion sensing three-axis accelerometer 135, the CPU 111 can either select intervals wherein continuous streams of signals from the water level sensor 133, wherein the measurements are regarded as valid because movement falls within an acceptable range such that the sensed level can be regarded as valid. In another embodiment, the water level sensor 133 receives a query from the CPU 111 based upon the movement of the water box 20 falling below a selected movement threshold. These queries would be recurrent and regular in their frequency to assure the safety of the concrete pump 50.

To understand the utility of the three-axis accelerometer 135, which, in the presently preferred embodiment, comprises a micro-machined proof mass that is suspended between two parallel plates, it is useful to understand its operation. In such an exemplary accelerometer at least one mass is suspended on flexures that are attached to a ring frame. This configuration forms two air gap capacitors between the proof mass and upper and lower plates. As the proof mass moves when acceleration is applied, one air gap decreases, and the other gap increases, thereby creating a change in capacitance proportional to acceleration. The MEMS accelerometer 135 includes a hermetic enclosure containing the proof mass and provides mechanical isolation and protection of the sensing mechanism. As such, MEMS accelerometers are well-suited for sensing in environments that are hostile to any non-solid-state precision electronic device. In an exemplary embodiment, the preferred embodiment is one in which ruggedness is enhanced using mechanical stops on the two outer wafers to restrict the travel of the proof mass.

In a presently preferred embodiment, once the accelerometer 135 senses an onset of an interval of stillness, the CPU 111 inquires of the water level sensor 133, the volume of water 21 in the water box 20. The CPU 111 then compares the most recent reading with those preceding it. Without significant change in volume, especially diminution in volume, the CPU 111 identifies the "U" cup seals as remaining efficient and the volume of water 21 as being sufficient to meet the "U" cup seals' required cooling and lubrication needs. As such, no further action is immediately necessary. Should the CPU 111, in comparison with earlier measured volumes and with designated thresholds, find that the most recent reading indicates a loss of volume of water 21 from the water box 20, the CPU 111 sends a trigger signal to the User Interface 139 to initiate some alarm as might be either in the form of a warning screen on a display, a warning light on the concrete pump, or a klaxon, any one of which would signal the need to replace the "U" cup seals. In the presently preferred embodiment, the CPU 111 will also send a signal causing the interface 139 to shut down the concrete pump 50.

Distinct Suitable Sensors for Water Level Sensor 133.

A level sensor 133 is a device selected from a number of embodiments designed to monitor, maintain, and measure liquid levels in the water box 20 (FIGS. 1, 2). About any of the presently preferred embodiments, the water level sensor 133 first detects a liquid level; the sensor then converts the perceived data into an electric signal. There are two main classifications for level sensors: point level sensors and continuous level sensors. Point level sensors are designed to indicate whether a liquid has reached a specific point in a container. Continuous level sensors, on the other hand, are used to render precise liquid level measurements. Either of the genres of sensors can be configured for use as the water level sensor 133 as a point level sensor can be used to signal water presence at a threshold level. Point level sensors can be further divided into invasive and non-contact sensors. Invasive sensors make direct contact with the substance they are measuring, while non-contact sensors use sound or microwaves. Here too, either of these subgenres are susceptible to employment to effect this invention. Noncontact sensors are useful where a contact sensor might contaminate a critically pure or uninfected liquid such as blood. In the context of the instant invention, no such contamination might present an impediment to this invention and either might be advantageously used to practice this invention.

There are many different types of point level sensors. One of the most basic point level sensors is the "float switch." When a liquid level rises or falls in a container, buoyancy of an attached float forces the switch upwards against the influence of gravity to either open or close a circuit. Float sensors, however, are delicate and while such sensors will work in strictly controlled context such as within a gas tank feeding an internal combustion engine, in the context of the instant invention, such a float switch might be useable but has been rejected for use in the presently preferred embodiment.

Unlike point level sensors, the two main types of continuous level sensors (ultrasonic and microwave) are non-contact. Ultrasonic level sensors emit sound waves, while "radar" sensors emit microwaves. The time interval between wave emission and reflection is directly proportional to the liquid level. Capacitance level sensors operate in the way that process fluids have dielectric constants, significantly different to air. They measure the change in capacitance between two plates produced by changes in level. Two versions are available, one for fluids with high dielectric constants and one with low dielectric constants.

The presently preferred embodiment of the invention employs a durable, versatile sensor that is preferred because of the ability to use such a sensor to sense at a lowest suitable threshold level for the volume of water 21 (FIGS. 1, 2) in the water box. Impedance spectroscopy or electrochemical impedance spectroscopy (EIS) involves measuring the impedance characteristics of an electrochemical system over a range of frequencies. The detecting electrode will be inserted either on a flange extending from the top or simply extending from the side of the hopper 92 and then installed inside the tank or hopper 92 (FIG. 1).

FIGS. 4A1, 4A2 and 4A3, demonstrate use of an EIS sensor. FIG. 4A1 depicts the basic hardware makeup of the electrode 30 of the impedance spectrometry sensor. As such, the capacitive pattern 32$nw$ is regular and predictable. Electrochemical impedance spectroscopy measures response of a circuit by applying an alternating current to an electrode in the medium to be measured, in the case of the instant invention, the volume of water 21 in the water box 20 and then measuring the responsive current response from the electrode. Electrochemical impedance is normally measured using a small excitation signal. This is done so that the electrode's response is pseudo-linear. In a linear (or pseudo-linear) system, the current response to a sinusoidal potential will be a sinusoid at the same frequency but shifted in phase. Thus, as depicted in FIG. 4A1, across all frequencies of interest, the frequency response is below that necessary to trigger the sensor.

When, as depicted in FIG. 4A2, a liquid such as that which makes up the volume of water 21 as it comes in contact with the electrode 30, the capacitive pattern 32$wp$ will be deformed by the presence of the liquid and thus, this embodiment of the water level sensor 133 will detect the shift in impedance (reciprocal of admittance) as occurs with the change between the air and the volume of water 21 under measurement, or between the volume of water 21 under measurement thereby shifting the frequency response of the circuit which includes the volume of water 21. Thus, the shifted frequency response causes the sinusoidal waves to trigger at specific frequencies as shown.

One virtue of the EIS configuration proposed is that it can compensate for any concrete mix present in the volume of water 21 in the water box 20. An impedance spectroscopy type level switch is also available with the systems of compensating the erroneous signal transmission from the adhering to and accumulating on the surface of electrode by means of a third protection (guard) electrode for compensation provided between the main detecting electrode and the grounding electrode. In this manner, the EIS electrode 30, as depicted in FIG. 4A3, the CPU 111 can compensate deformation of the capacitive pattern 32$pr$ for any cement residue left on the electrode in the absence of water. When no water is present, the CPU 111 will shut down the concrete pump 50.

Deposits and foam often make reliable level detection difficult. The impedance spectroscopy technology measures the electric and magnetic field strength at multiple frequencies between 50 . . . 200 MHz range. Each medium creates a unique signature profile across this high frequency spectrum sweep. At each point, three measurements are made:

Attenuation (dampening) of the electromagnetic field

Conductance of the electric field (ability to conduct an electric current)

Permittivity (ability to polarize particles) of the magnetic field

When water is present, these measurements match the profile. With no medium present or only residue present, the measurements do not match. When the measured profile falls in the green switching zone, the output of the sensor changes state.

Figure 4B:
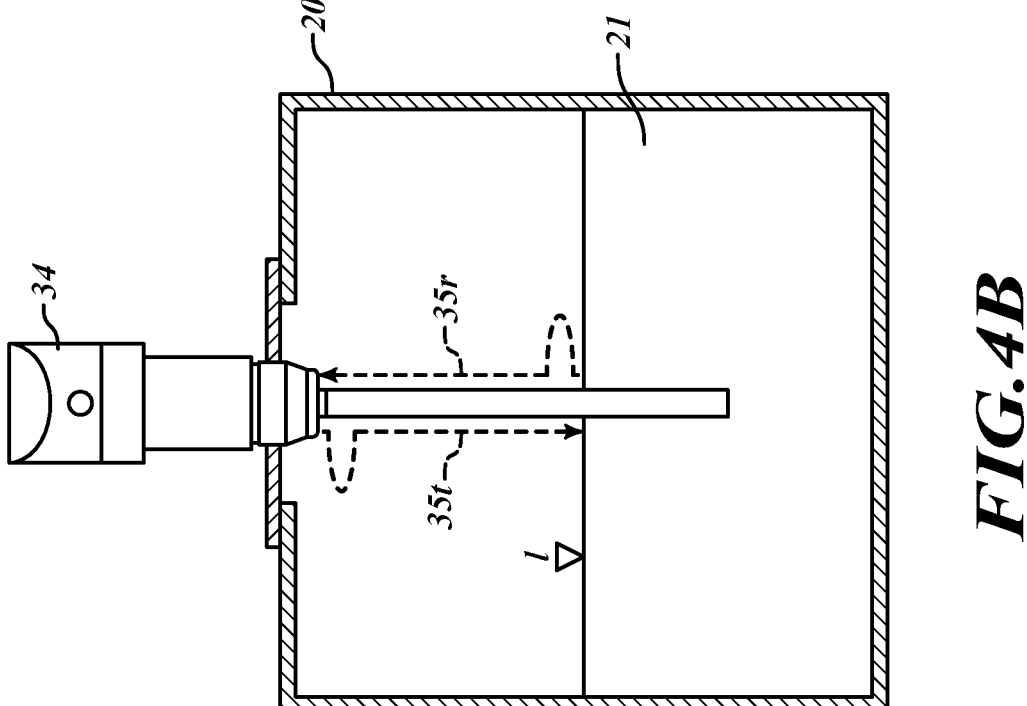
FIG. 4B depicts a guided radar sensor in transmitting a radar pulse to the target water level and the radar pulse reflected to the sensor receiver.

In an alternate embodiment, FIG. 4B depicts a guided wave radar sensor to be employed as a water level sensor 135 mounted in the water box 20. In principle, this alternate embodiment employs radar generating an electromagnetic pulse to travel at the speed of light down to the level l to determine the volume of water 21 in the water box 20. Radar can provide very precise level information and can compensate for fixed structures within the container. This embodiment is currently not the presently preferred embodiment due to its high relative initial cost of the sensor when compared to the EIS sensor described above. As the technology has become more mature, several manufacturers are making this technology more accessible to the wider market. In the event trends continue as they have, tumbling prices might make this a more desirable alternative embodiment. These sensors are among the handful of technologies that work well in foam and more viscous substances.

The operation of radar or microwave sensors is similar to ultrasonic. In such an embodiment, the guided wave radar sensor 34 relies upon a transmitted radar pulse 35t down to the water level l, and a reflected pulse 35r is reflected back to the receiver on the guided wave radar sensor 34. But the pulses 35t and 35r travel at the speed of light and timing each transit between the sensor 34, the water level l and back to the sensor 34 determines the measurement of the water level l. These sensors 34 send microwaves by an antenna on the radar sensor 34; the time from emission to receiving of the signal is proportional to the distance to the water level l. However, very accurate level information can be obtained with radar and also compensate for fixed structures within the container. The radar sensors 34 are unaffected by dust, temperature or pressure. These are very accurate and need no calibration. The radar sensors are expensive and have a limited detection range.

Figure 4C:
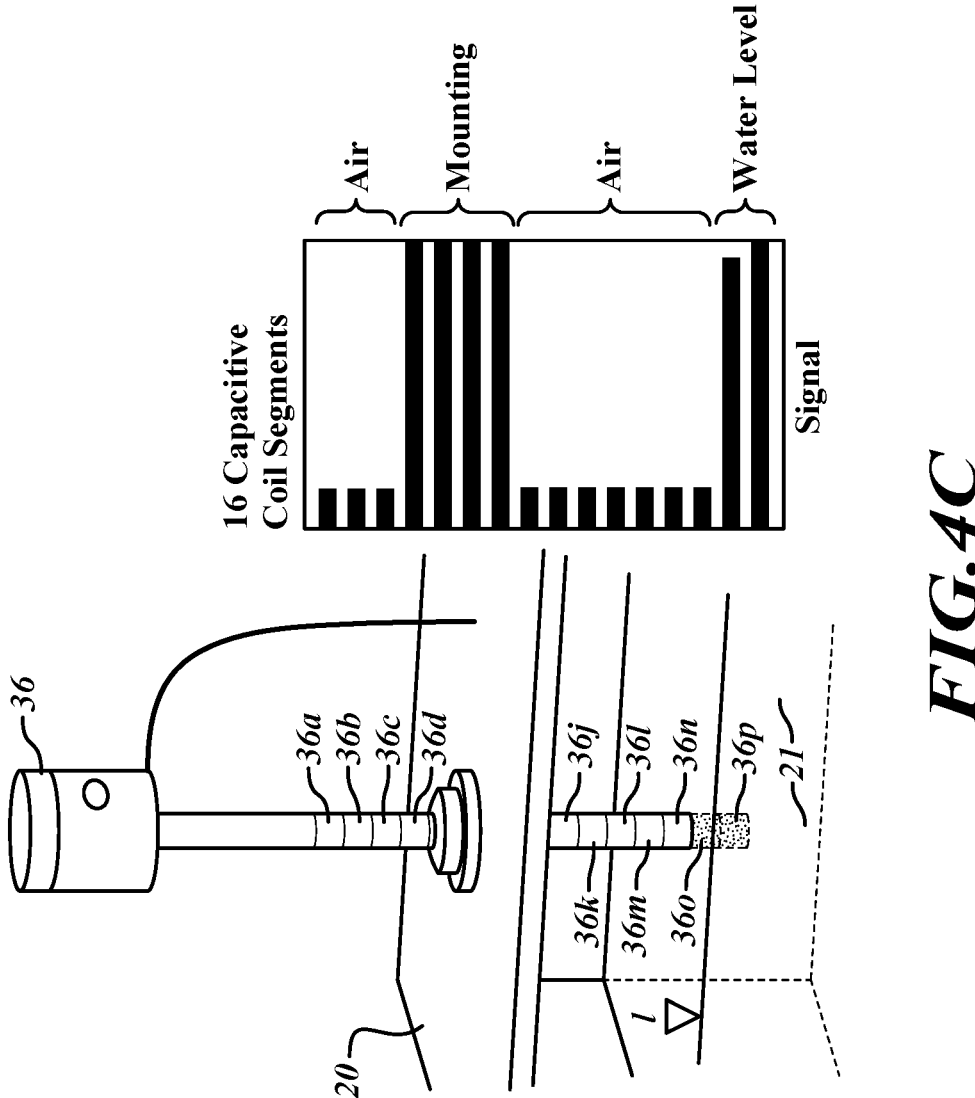
FIG. 4C depicts a capacitive continuous level segmented level sensor.
Figure 4D:
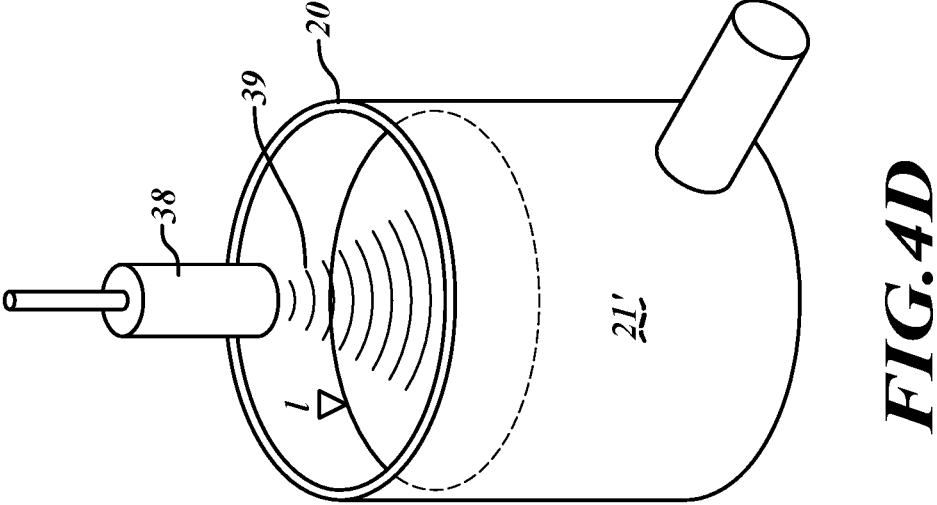
FIG. 4D depicts an ultrasonic height sensor.

FIG. 4C depicts a capacitive continuous level sensor 36. Unlike the radar sensor 34, the capacitive continuous level sensor 36 needs to be calibrated to the specific material to excuse the varying dielectric constants and differences in the tank design. As this type of technology is contact based, the reliability of these sensors can be heavily influenced by fluids sticking to the probe. In the case of cement mix that might be present in a volume of water 21, the capacitive continuous level sensor 36 can be calibrated to remove from consideration the presence of concrete mix in the volume of water 21.

Each such sensor 36 relies upon a series of a random number of sensing cells, in this nonlimiting example, sixteen such cells 36a-36p. The principle of capacitive level measurement is based on the capacitance change of a capacitor. The probe sensor 36 and the water box 20 wall form a capacitor whose capacitance is dependent on the amount of product in the tank: an empty tank has a lower, a filled tank a higher capacitance. Capacitors can store energy in an electric field between these electrodes when a voltage or 'potential' is applied to the circuit. The property of capacitance relates the amount of energy stored in this field to the applied voltage or potential.

By placing non-conductive material such as the volume of water 21 between the electrodes, the ability for the capacitor to store energy increases and so the capacitance increases. This material between the electrodes is referred to as the 'dielectric'. The key property of dielectric materials is the amount of charge that can be stored. As a dielectric liquid is introduced between the electrodes of the capacitor, the capacitance changes proportionately and liquid level can be determined.

To measure variations in the capacitance, electric energy flowing into and out of the electrodes is measured as the voltage or potential is varied. This flow of energy is created by connecting the electrodes to an alternating current measurement circuit. The greater the energy flow to the electrodes, the greater the capacitance, meaning more dielectric between the electrodes. For level sensor calibration, reference measurements at empty and full tank levels must be taken. Generally, the dielectric constant value of the liquid being measured is required to enable calibration of the sensor at its 'full' level. With the empty and full outputs set, liquid level sensing comes down to relating the sensor output to these values. Each cell 36a-36p functions as an individual capacitor. Thus, each cell 36a-36p yields a distinct capacitance so even the mounting bracket can be sensed at distinct cells 36d-36g. In the same way as described above, the capacitive continuous level sensor 36 produces sixteen (in this embodiment) distinct values for capacitance.

Much like the description of the guided wave radar sensor 34 (FIG. 4B), ultrasonic sensors 38 measure a water level l by calculating the duration and strength of high frequency sound waves 39 that are reflected off the surface of the volume of water 21' in the water box 20' and back to the sensor 38—the time taken is relative to the distance between the sensor and the liquid. The length of time in which the ultrasonic sensor 38 takes to react is affected by various elements in the atmosphere above the media such as turbulence, foam, temperature, etc.

Ultrasonic detection can monitor objects whose surface structure, material, or color/translucence might distort the readings of other sensors. Even miniscule objects can be measured. Regardless of application—ultrasonic distance sensor, ultrasonic level sensor, and more—measurements can be captured with fine-tuned precision. For this reason, it is particularly well-suited for the instant application.

Figure 4E:
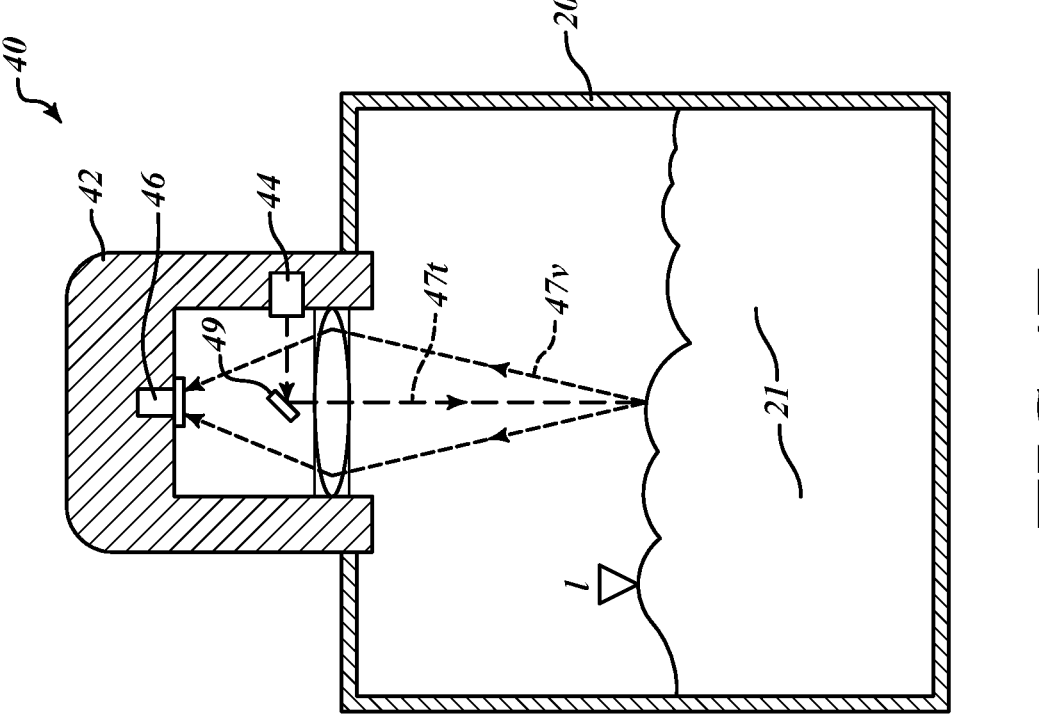
FIG. 4E depicts a laser distance sensor.

FIG. 4E depicts an optical sensor 40. There are a range of technical terms used to describe this type of level sensing technology. Optical prism, electro-optic, single-point optical, optical level switch . . . the list goes on. Within this application, the applicant will use the term optical level switch 40. Lasers operate on a principle very similar to that of ultrasonic level sensors 38 and radar sensors 34. Instead of using the speed of sound to find the water level l, however, they use the speed of light as does the radar sensor 34. A laser transmitter 44 at the top of a housing 42 fires a short pulse of light. A mirror 49 directs that pulse downward to the level l of the volume of water 21, which reflects it back to a detector 46. A timing circuit measures the elapsed time (TOF) and calculates the distance. The key to the optical sensor 40 is that lasers have virtually no beam spread (0.2 degree beam divergence) and no false echoes, and can be directed with accuracy; lasers are precise, even in the presence of vapor and foam. Lasers much be used in conjunction with specialized sight windows to isolate the transmitter from the process. These glass windows must pass the laser beam with minimal diffusion and attenuation and must contain the process conditions.

By using a high energy IR diode and pulse modulation methods, the interference from the produced light can be reduced. In simple terms, optical level switches work by converting light rays into electrical signals which measure a physical quantity of light and then translate it into a measurement. These sensors also don't have moving parts, are not affected by high temperature or pressure, can be used in liquid applications, and are small in size. These are particularly well-suited for use in the abrasive and wet environments. Likewise, in a control scheme, the monitoring algorithm is based upon sensing a minimum level of water 21 in a water box 20. This is not the presently preferred embodiment but can be configured in a highly effective configuration.

While the preferred embodiment of the invention has been illustrated and described, as noted above, many changes can be made without departing from the spirit and scope of the invention. Accordingly, the scope of the invention is not limited by the disclosure of the preferred embodiment.

The invention claimed is:

1. An apparatus for preventing undue wear on a concrete pump relying upon a volume of water in a water box for cooling and lubricating pumping seals on a material pumping piston within a material pumping cylinder, the apparatus comprising:

a three-axis accelerometer to generate a vibration signal, a water level sensor to generate a water level signal to represent the water level of the water box in the concrete pump; the water level sensor activated at intervals wherein the vibration signal indicates the water in the water box is suitably still to measure a water level in the water box, the water level sensor generating a water level signal indicative of the water level;

a computing device comprising a memory and a central processing unit (CPU) configured to receive the generated vibration signal and the generated water level signal from the three-axis accelerometer and the water level sensor and to apply an algorithm drawn from the memory to determine whether the water level in the water box is sufficient for operation of the concrete pump and if not sufficient, to generate a water level alert;

an interface to receive a water level alert from the CPU and in response to the alert, to execute a pump-preserving action.

2. The apparatus of claim 1 wherein the pump-preserving action is an action selected from a pump preserving action group consisting of:

sounding a klaxon alarm;

displaying an alert on a display screen;

playing a recorded warning to an operator; and shutting down operation of the concrete pump.

3. The apparatus of claim 1, wherein the computing device is a programmable logic controller.

4. The apparatus of claim 1, wherein the computing device comprises:

a processor unit (CPU) which interprets inputs, executes the control program stored in memory and sends output signals;

a memory unit storing data from inputs and program to be executed by the CPU;

an input and output interface, where the CPU receives and sends data from/to external devices; and a communications interface to receive and transmit data on communication networks.

5. The apparatus of claim 1, wherein:

the memory further comprises an algorithm the CPU uses to compare the water level as determined by the water level signal to the water level determined by the vibration signal and when the water level based upon the water level signal does not substantially agree with the water level, based upon the vibration signal indicative of water movement in the water box, directs the CPU to generate an error signal; and the interface to receive the error signal from the CPU and in response to the error signal, to execute the pump-preserving action.

6. The apparatus of claim 5 wherein the water level sensor is selected from a water level sensor group, the water level sensor group consisting of:

a guided wave radar sensor;

a capacitance level sensor;

an ultrasonic level sensor;

a float switch;

an optical level switch;

electric impedance spectroscopy sensor; and a capacitive continuous level sensor.

7. The apparatus of claim 5 wherein the water level sensor is selected from a mode group, the mode group consisting of:

a point level sensor; and a continuous level sensor.

8. A method for operation of a concrete pump based upon a sensed water level in a water box the concrete pump the water box including a water level sensor, includes, the method comprising:

providing a three-axis accelerometer affixed to the concrete pump in mechanical fixedity;

sensing in the three-axis accelerometer vibrations of the water box;

generating a vibration signal to represent vibration of the water box, the vibration signal indicative of the sensed water movement in the water box;

sensing a water level in the water box by means of the water level sensor;

receiving the vibration signal and the water level sensor at a computing device comprising a memory and a central processing unit (CPU);

applying an algorithm drawn from the memory to determine whether the water level in the water box is sufficient for operation of the concrete pump and if not sufficient, to generate a water level alert; in response to a water level alert; to execute a pump-preserving action.

9. The method of claim 8, wherein the pump-preserving action is an action selected from a pump preserving action group consisting of:

sounding a klaxon alarm;

displaying an alert on a display screen;

playing a recorded warning to an operator; and shutting down operation of the concrete pump.

10. The method of claim 8, wherein the wherein the computing device is a programmable logic controller.

11. The method of claim 8, the computing device comprises:

a processor unit (CPU) which interprets inputs, executes the control program stored in memory and sends output signals;

a memory unit storing data from inputs and program to be executed by the CPU;

an input and output interface, where the CPU receives and sends data from/to external devices; and a communications interface to receive and transmit data on communication networks.

12. The method of claim 8, wherein generating a vibration signal based upon the sensed water level in the water box further comprises:

receiving the vibration signal and the water level signal at the CPU;

generating an error signal when the water level based upon the water level signal when compared to the water movement based upon the vibration signal, wherein sensed water movement does not correspond to the sensed water level;

providing an interface to receive the error signal from the processor; and in response to the error signal, executing the pump-preserving action.

13. The method of claim 12 wherein the water level sensor is selected from a water level sensor group, the water level sensor group consisting of:

a guided wave radar sensor;

a capacitance level sensor;

an ultrasonic level sensor;

a float switch;

an optical level switch;

electric impedance spectroscopy sensor; and a capacitive continuous level sensor.

14. The apparatus of claim 12 wherein the water level sensor is selected from a mode group, the mode group consisting of:

a point level sensor; and a continuous level sensor.

* * * * *